United States Patent [19]

Prucnal et al.

[11] Patent Number: 5,073,980
[45] Date of Patent: Dec. 17, 1991

[54] PHOTONIC SWITCH EMPLOYING SHARED DATA TRANSMISSION FACILITY

[75] Inventors: Paul R. Prucnal; Philippe A. Perrier, both of Princeton, N.J.

[73] Assignee: The Trustees of Princeton University, Princeton, N.J.

[21] Appl. No.: 399,852

[22] Filed: Aug. 29, 1989

[51] Int. Cl.⁵ .......................................... H04B 10/24
[52] U.S. Cl. .................................. 359/140; 370/92; 340/825.52
[58] Field of Search ...................... 370/10, 9, 8, 92, 4; 340/825.52, 825.57, 825.61, 825.64; 455/608

[56] References Cited

U.S. PATENT DOCUMENTS 3,815,093 6/1974 Caretto et al. ................. 340/825.54

OTHER PUBLICATIONS

P. W. Smith, "On the Role of Photonic Switching in Future Communications Systems", IEEE, 1987, pp. 1570-1574.
Ron A. Spanke, "Architectures for GuidedOWave Optical Space Switching Systems", IEEE Communications Magazine, vol. 25, No. 5, May 1987, pp. 42-48.
Midwinter et al., "Guest Editorial Photonic Switching", IEEE Journal of Selected Areas in Communications, vol. 6, No. 7, Aug. 1988, pp. 1033-1034.
Ron et al., "16×18 Space Switch for 2·24 Gbit/s Transmission", Electronics Letters, vol. 23, No. 5, Feb. 26, 1987, pp. 236-237.
Paul R. Prucnal, "Optical Interconnections for VLSI Local-Area-Networks", IEEE ElectroTechnology Review, 1986, pp. 97-98.
Paul R. Prucnal, "All-Optical Ultra Fast Networks", Data Communications Systems and Their Performance, 1988, pp. 3-11.
Arthurs et al., "Multiwavelength Optical Crossconnect for Parallel-Processing Computers", Electronics Letters, vol. 24, No. 2, Jan. 21, 1988, pp. 119-120.
Paul R. Prucnal et al., "Ultrafast All-Optical Synchronous Multiple Access Fiber Networks", IEEE Journal on Selected Areas in Communications, vol. SAC-4, No. 9, Dec. 1986, pp. 1482-1493.
Paul R. Prucnal et al., "TDMA Fibre-Optic Network with Optical Processing", Electronic Letters, vol. 22, No. 23, Nov. 6, 1986, pp. 1218-1219.

*Primary Examiner*—Curtis Kuntz
*Assistant Examiner*—Leslie Pascal
*Attorney, Agent, or Firm*—Perman & Green

[57] ABSTRACT

An optical message distribution system is described which includes both a plurality of message sources and destinations. Each optical message includes a destination address portion and a data portion containing data signals. At a message source, an encoder generates, for each data signal of one kind, an optical pulse whose time position relative to a frame is indicative of a message destination address. An optical summer, common to all message sources combines the optical pulses onto an optical transmission medium and transmits them to an optical decoder associated with the each message destination. Each optical decoder determines if the time position of a received optical pulse relative to the frame is equal to a preset time delay, and if so, generates a data pulse of the one kind for the message destination.

3 Claims, 3 Drawing Sheets

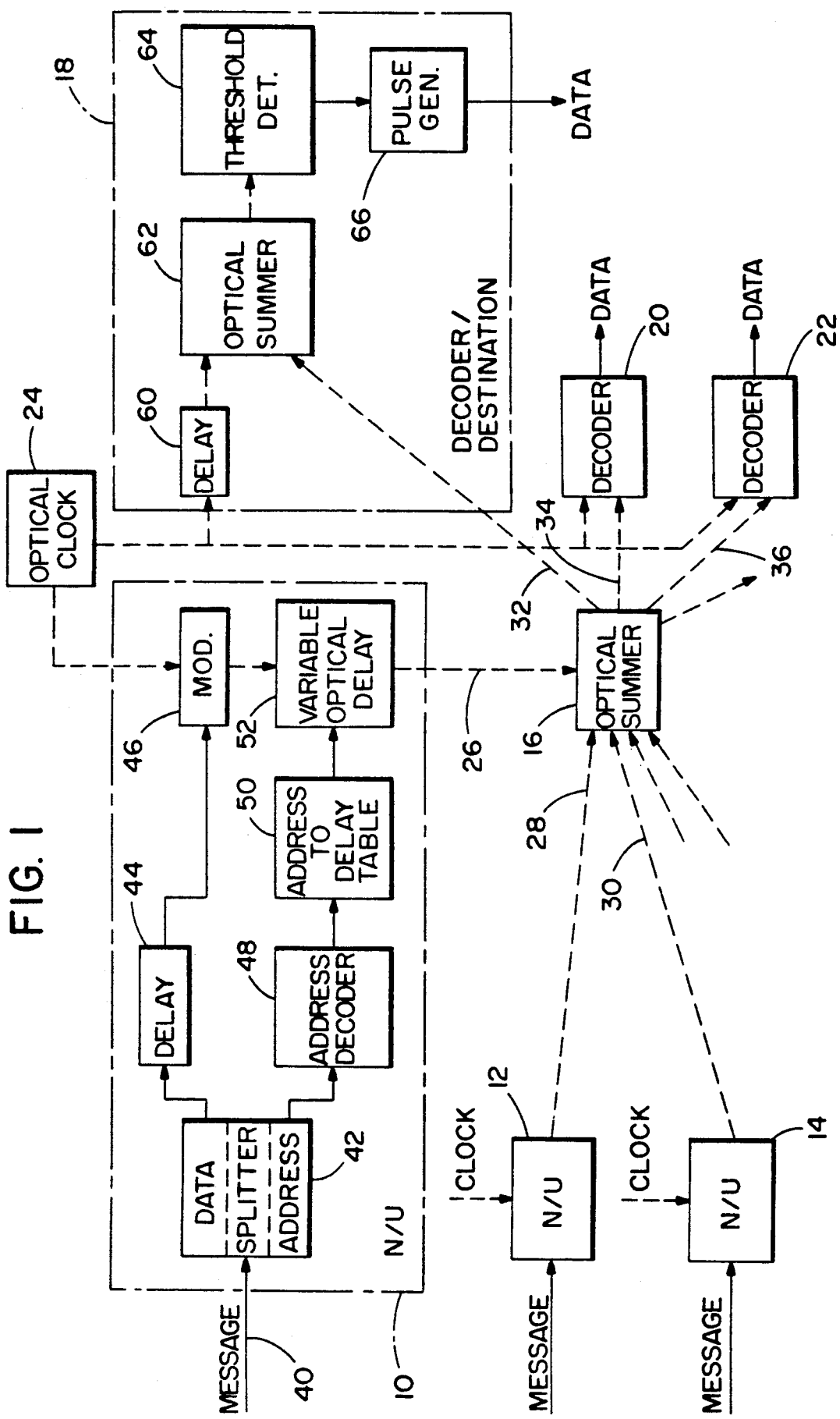

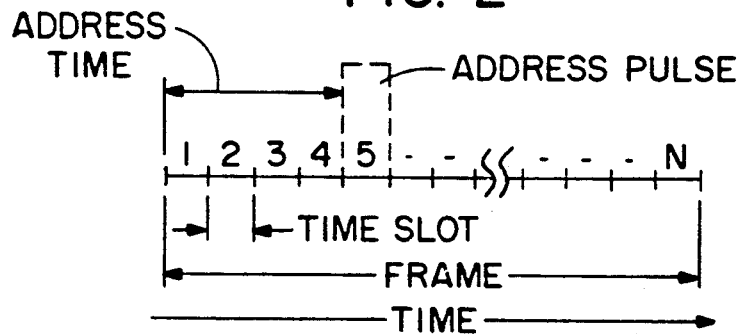
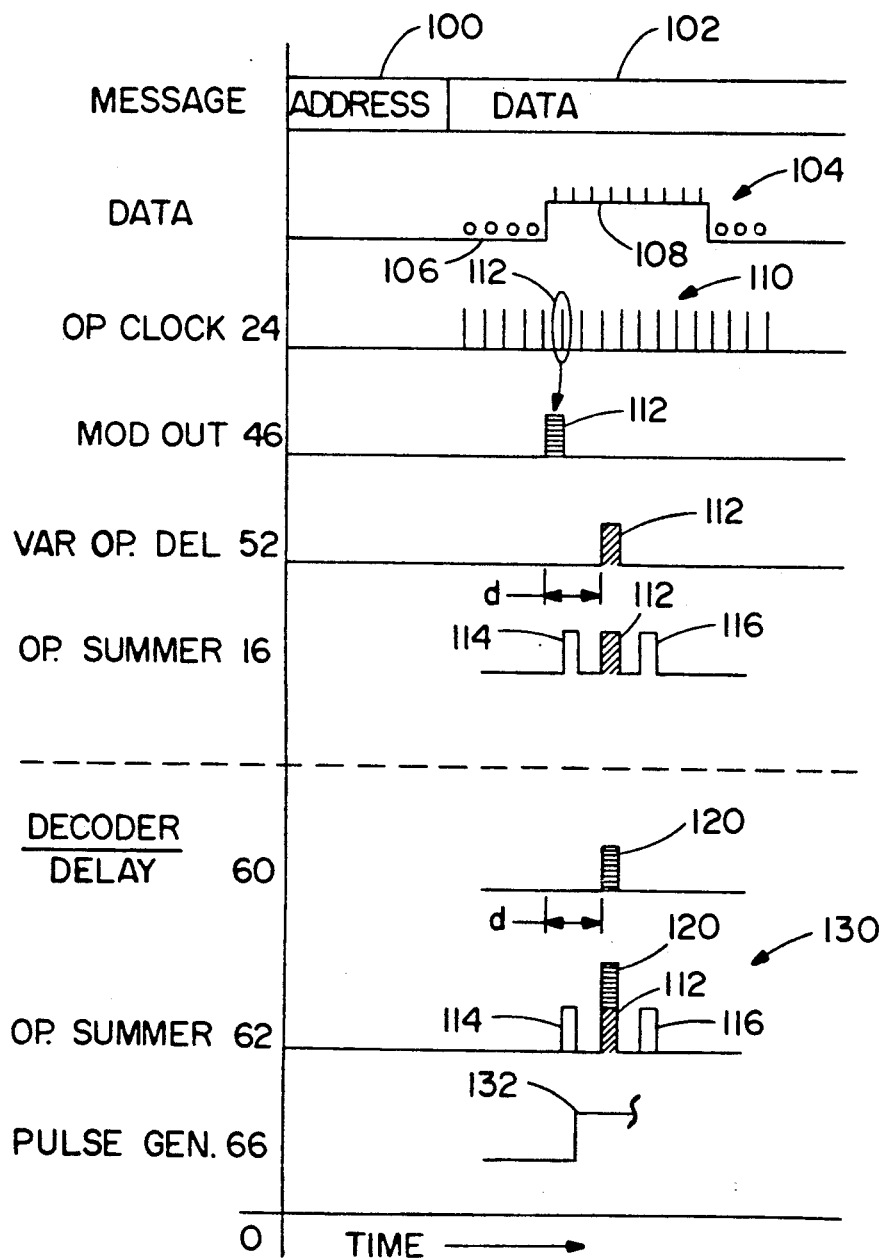

PHOTONIC SWITCH EMPLOYING SHARED DATA TRANSMISSION FACILITY

FIELD OF THE INVENTION

This invention relates to photonic switching, and more particularly, to a photonic switch which employs a common transmission medium for all input/output port connections.

BACKGROUND OF THE INVENTION

The use of optical fiber systems permits broad-band signals to be transmitted reliably and cheaply. In present communication networks, routing, switching and other signal processing operations are still carried out electronically, so that optical signals still must be converted to electrical signals at each end of the communication link. There is a growing need to postpone the electronic interface beyond the communication link and to perform signal processing operations in the optical domain.

Three classes of switches have been investigated in the optical domain: time division, wavelength division, and space division switches. In prior art optical time division switches (also known as time-slot interchangers), switching is carried out with architectures similar to their electronic counterparts. A time-multiplexed optical data stream is sequentially demultiplexed; the data in each time-slot is written into an optical memory cell; the contents of each cell is read out in a desired order and multiplexed onto an output highway thus accomplishing the desired time-slot permutation. Optical implementations of time division switches have used integrated optic switch matrices as optical write and read gates; and fiber optic delay lines or bistable laser diodes as optical memories. These approaches evidence a number of shortcomings, not the least of which being the requirement for large numbers of discrete devices to implement portions of the switching structures.

Wavelength-division switches will have the benefit of a potentially high throughput, but since only experimental wavelength converters are available, their development is at an early stage. Such a switch is described in "Multi-Wavelength Optical Cross Connect for Parallel-Processing Computers" by Arthurs et al., Electronic Letters, Vol. 24 (2) pp. 119-120, June 21, 1988. Therein is described a multiwavelength optical interconnection switch which employs a star coupler as a common optical cross-connect. Tunable laser transmitters provide various frequencies that are combined in the star coupler; transmitted in tandem to a plurality of fixed-wavelength receivers; with each receiver extracting its particular wavelength imposed. Laser transmitters which are economical and rapidly tunable over a wide range are not readily available. Thus, while a wavelength division system has the advantage of employing common transmission media, its method of encoding is not now economically practical.

Space division photonic switches commonly employ 4-port switching elements. The switching element that has received the most attention employs a Lithium Niobate, electro-optic crystal. Photonic switch arrays have been implemented by connecting several of these switching elements as optical cross points to provide physical paths for each signal. The fabrication of large optical switches using integrated optical switching elements is limited by several factors. First, the minimum cross sectional dimension required to confine light to a wave guide is approximately equal to its wavelength. Furthermore, the minimum interaction length required to produce switching is determined, in part, by the electro-optic strength of the material. Together, these factors restrict the minimum size of the optical switching element. The density of components is further limited by the minimum wave guide bend radius which exhibits acceptable loss. Finally, cumulative effects of wave guide propagation losses and crosstalk can be unacceptably high for large arrays.

Of the above-described optical switches, space division switching has seen substantial development. One subclass of space division switches (referred to as "time-multiplexed space division switches") employs a multiple access scheme wherein data is sent to all destinations, with each destination recognizing only that data which is directed to it. In articles entitled "Ultra Fast All-Optical Synchronous Multiple Access Fiber Networks" by Prucnal et al., IEEE Journal on Selected Areas in Communications, Vol. SAC-4 (9) December, (1986) pp. 1484-1493, and "TDMA Fiber-Optic Network with Optical Processing", Prucnal et al. Electronic Letters, Vol. 22 (23) 1986, pp. 1218-1219, both time division and code division, multiple access optical systems are described. In the time division multiple access system, each destination is assigned a time-slot during which the destination can receive a bit of information. All information is transmitted over a common transmission path and the destination only is enabled to receive information during its assigned time-slot.

In the code division multiple access system, a code sequence is transmitted and corresponds to the destination address. The destination recognizes the code sequence and uniquely recognizes that the data so encoded is destined for it. The code division multiple access scheme overcomes the time division system problem of having no data in an assigned time slot with a resultant loss of data transfer capability. However, the generation of multiple pulse addresses presents complexities in optical encoding and decoding system which are difficult to overcome.

It is known that the integration of large arrays of optical cross points are difficult to fabricate. If such an array network could be "collapsed" into a single switch configuration, both operational and cost benefits would accrue.

Accordingly, it is an object of this invention to provide a multiple access, optical communication system which employs a common transmission medium.

It is another object of this invention to provide a multiple access system wherein the encoding technique is particularly adapted to optical processing.

SUMMARY OF THE INVENTION

An optical message distribution system is described which includes both a plurality of message sources and destinations. Each optical message includes a destination address portion and a data portion containing data signals. At a message source, an encoder generates, for each data signal of one kind, an optical pulse whose time position relative to a frame is indicative of a message destination address. An optical summer, common to all message sources, combines the optical pulses onto an optical transmission medium and transmits the pulses to an optical decoder associated with the each message destination. Each optical decoder determines if the time position of a received optical pulse, relative to the frame, is equal to a preset time delay and if so, generates a data pulse of the one kind for the message destination.

DESCRIPTION OF THE DRAWINGS

FIG. 1 is a block diagram of an optical message distribution system configured in accordance with the invention.

FIG. 2 is an illustration of an address frame employed by the system of FIG. 1.

FIG. 3 is a waveform diagram of signals appearing in the system of FIG. 1.

DETAILED DESCRIPTION OF THE INVENTION

Figure 4:
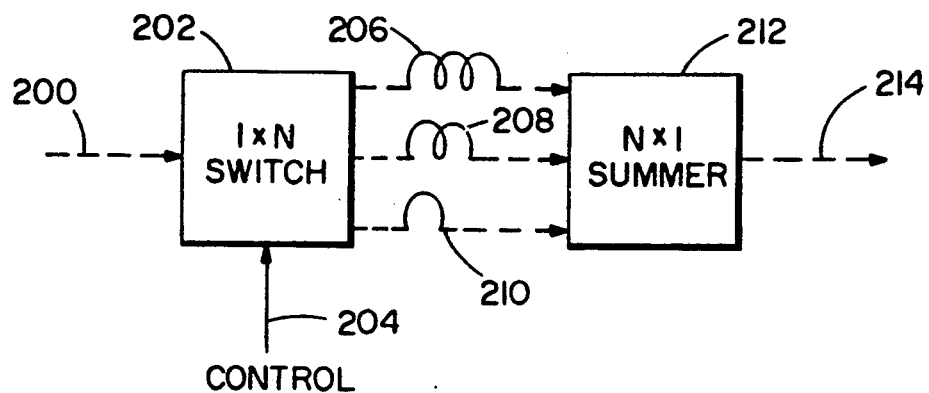
FIG. 4 is a block diagram of a variable optical delay.

In FIG. 1, a block diagram of an optical switch incorporating the invention is illustrated. The system of FIG. 1 will be described in conjunction with the address frame diagram of FIG. 2 and the waveform diagrams of FIG. 3. In the optical switch of FIG. 1, a plurality of network interface units (NIU's) 10, 12, and 14 are coupled, via an optical summer 16, to a plurality of decoder/destination units 18, 20, and 22. An optical clock 24 provides clock pulses which enables the synchronous operation of the network switch. All lines in FIG. 1 which are shown as dotted connote optical links such as fibers. Solid lines are electronic interconnections.

Optical summer 16 may be any optical device which combines the signal inputs appearing on input lines 26, 28, 30, etc. and provides the combined signals onto output lines 32, 34, 36, etc. In its most simple form, optical summer 16 may be configured as a star coupler which comprises a plurality of twisted optical fibers melted to make a coupling junction. In such a star-coupler, all signals appearing on input fibers are combined and appear in common on all output fibers, albeit with reduced energy levels.

Optical clock 24 may be configured as a mode-locked laser which generates optical pulses at a high repetition rate. For instance, optical clock 24 may generate 80 picosecond pulses at a 100 MHz rate with each 10 nanosecond interval corresponding to a single bit interval.

Prior to considering the remainder of FIG. 1 and its operation, attention is directed to FIG. 2 wherein an address frame portion of a message is schematically shown. The address frame comprises a plurality of time slots, each slot capable of containing one optical pulse. The address frame commences with time slot 1 and may have any number of following slots to accommodate additional optical pulses. The frame is of the same length as a bit interval and the next frame then commences. An address is encoded within a frame by placing an address pulse in one of the time slots. The actual address is the elapsed time between the beginning of the frame and the address pulse. It can be seen that with N time slots, there can be, in effect, N destination addresses contained within a single address frame.

Returning to FIGS. 1 and 3, each of NIU's 10, 12, and 14 is adapted to receive a message which includes an address frame 100 followed by a data portion 102. As each of the NIU's is identical in structure, only NIU 10 will hereinafter be considered in detail, it being understood that NIU's 12 and 14 operate similarly. An incoming message appearing on line 40 is applied to splitter 42 which divides the data portion from the message and applies it via delay 44 to modulator 46. The address portion of the message is applied to address decoder 48 and thence to a conversion table 50 where the address is converted to an appropriate delay time. The output of table 50 is applied to a variable optical delay 52 whose structure and operation will be discussed below. While splitter 42, delay 44, address decoder 48 and conversion table 50 are shown as independent entities, it should be understood that in actuality, they are functions which may be provided by an appropriately programmed microprocessor.

In operation, splitter 42 extracts from an incoming message on line 40, the address portion and applies it to address decoder 48. Decoder 48 analyzes the address information and determines which optical time slot corresponds to the address. Conversion table 50 determines the proper time delay between the beginning of a frame and the time slot determined by address decoder 48, and sets variable optical delay 52 to delay an incoming optical pulse by the determined time delay.

The data portion of the incoming message is supplied via delay 44 to optical modulator 46. The delay period of delay 44 is equal to the delay seen by the message's address portion as it is processed through decoder 48, conversion table 50 and the time for setting optical delay 52. The output from delay 44 essentially acts as a gating signal for modulator 46 so that when logical signals of one kind (e.g. "ones") are applied to modulator 46, the clock pulses produced by optical clock 24 are gated and applied to variable optical delay 52. This is shown in FIG. 3 wherein data signal 104 traverses from a "0" level 106 to a "1" level 108. During the period that a data signal is at the "1" level, optical clock pulses 110 are gated through modulator 46 and applied to variable optical delay 52 (each optical clock pulse is equivalent to a single data bit). A single clock pulse 112 which is gated by modulator 46 is shown expanded on the modulator output line in FIG. 3.

If it is assumed that table 50 determines that pulse 112 must be delayed by a time d, the pulse applied to variable optical delay 52 is accordingly delayed and applied via optical fiber 26 to optical summer 16. There, delayed pulse 112 is combined with pulses 114 and 116 (assumed, for purposes of explanation, to appear from other NIU's during this particular address frame time). Each of pulses 114 and 116 is destined for other locations whose address time delays are different than that for pulse 112. The composite signal comprised of pulses 112, 114, and 116 is placed on optical fibers 32, 34, 36, etc. and sent in common to a plurality of decoder/destination circuits 18, 20, and 22 etc.

Each decoder circuit comprises a delay 60 which is optically coupled to an optical summer 62, whose output is, in turn, applied to a threshold detector 64. The output from threshold detector 64 is applied to a pulse generator 66 whose output comprises a reconstructed digital data signal stream. The time delay of delay 60 is preset so that any applied optical pulse is delayed by a duration which is equivalent to the address of the respective decoder/destination. Thus, each of decoders 18, 20, and 22 has a different delay which is equivalent to the address of the associated destination.

When a clock pulse is applied to delay 60, it is delayed by a period of time equal to the address time shown in FIG. 2. This is shown in FIG. 3 by pulse 120 which has been delayed by time duration d. The delayed clock pulse 120 is applied as one input to optical summer 62, and the pulse train comprising pulses 112, 114, and 116 is applied via optical fiber 32 to its other input. It will be recalled that address pulse 112 is the pulse which was delayed in NIU 10 by duration d in accordance with the address of decoder/destination 18. That same delay has been applied to clock pulse 120 (emanating from delay 60). It can then be seen that pulses 112 and 120 are in time coincidence when they arrive at optical summer 62. As a result, the output of optical summer 62 is as shown at 130, and comprises a composite of the applied signals. It will be noted that pulses 112 and 120 add and provide a combined optical pulse whose energy is substantially in excess of other, non-coincident address pulses 114 and 116. Threshold detector 64 is set to block pulses 114 and 116 and to allow to pass only pulses having an energy which exceeds that of an address pulse (e.g., such as coincident pulses 112 and 120).

Upon the occurrence of such coincident pulses, threshold detector 64 provides an output to pulse generator 66 which, in turn, generates a data level corresponding to the "1" level 108 of data sequence 104 (FIG. 3). Thus pulse generator 66 which had already provided an output level 132 as a result of a previous "1" data pulse, continues its uplevel as the result of receiving the output from threshold detector 64. It is only when the data level in the time slot under consideration, falls to the "0" level, that pulse generator 66 will cease providing high level outputs.

In constructing a switch such as shown in FIG. 1, it is preferable that all NIU's be in close proximity, as that facilitates synchronous distribution of the optical clock pulses to the various NIU and decoder ports. For the optical clock pulses to arrive synchronously at all input and output ports, the distance between all NIU's and optical clock source 24 must be an integral multiple of an address frame. It is also desirable that the frames arrive at the decoders in synchronism with the clocks so that, at a given output decoder, the clock signal superimposes exactly with its associated time slot. Therefore, the length of fiber between each NIU and output decoder must be an integral multiple of the frame length. Input signals need not arrive time-aligned at the NIU input ports. Indeed, even though incoming bits on different input ports might be out of synchronization, they gate a synchronized clock and synchronization between input ports is achieved by the modulator, provided the optical clock pulses are not gated during a transition time of a data signal.

Figure 5:
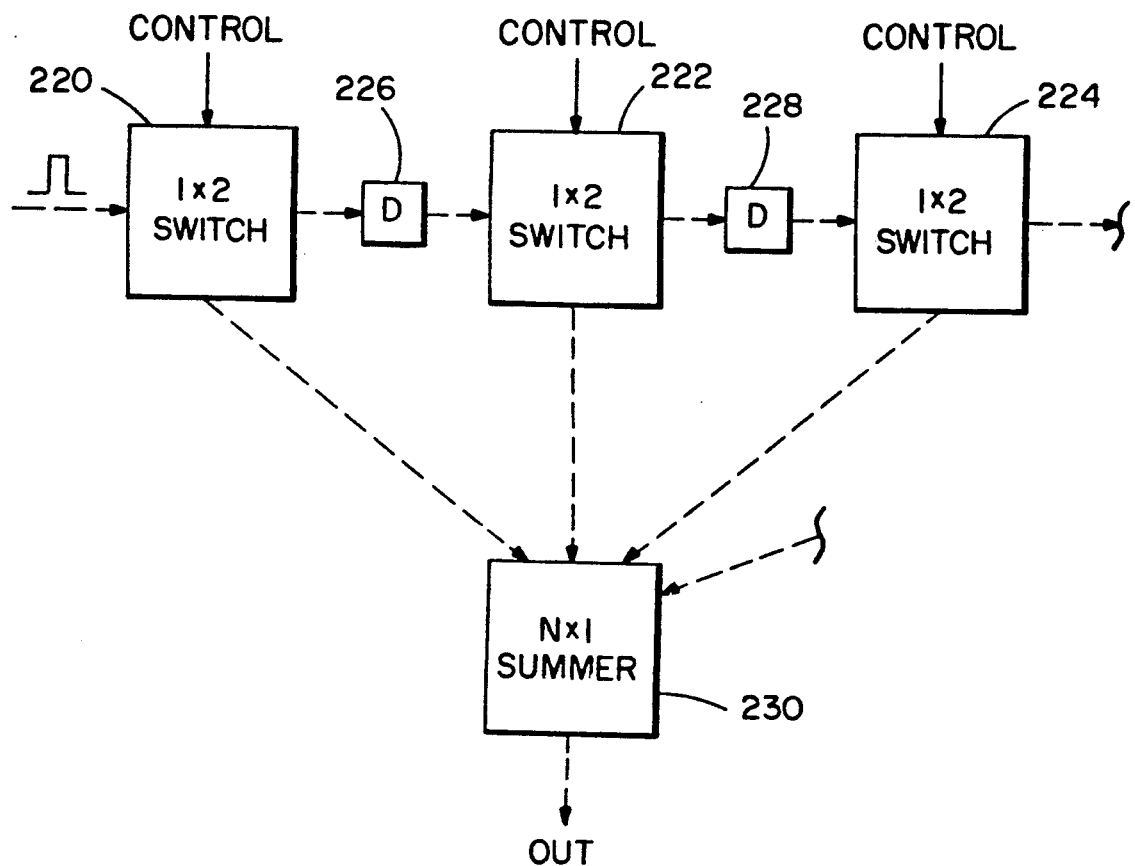
FIG. 5 is a block diagram of another implementation of a variable optical delay.

Referring to FIGS. 4 and 5, several implementations of a variable optical delay suitable for use with this invention are illustrated. In FIG. 4, the data pulses are applied via input fiber 200 to optical switch 202. Switch 202 is controlled by inputs on line 204 to direct the incoming optical signal to one of optical fiber delay lines 206, 208, or 210. The outputs from these delay lines are summed in summer 212 and the output appears on fiber 214. Thus, in accordance with the input on control 204, the pulse delay seen from input fiber 200 to output fiber 214 can be selectively controlled. Instead of summer 212, an N×1 opto-mechanical switch similar to optical switch 202 could be used.

In FIG. 5, an alternative serial delay system is shown wherein optical switches 220, 222, and 224 are connected in series through optical delays 226, and 228. By controlling the position of the various optical switches, an optical signal can be caused to traverse either through none, one or two delays before it is applied to summer 230. In other words, the control signals determine which of switches 220–224 etc. are set so that the input pulse continues to pass through the serially connected delays and which switch is to redirect the thus delayed optical pulse to summer 230 and thence to the output.

It can thus be seen that since the above described switch does not rely on the use of distinct physical paths between input and output ports, limitations imposed by integrated optic cross points are avoided and very large switch configurations are possible. It should be noted that at high repetition rates, the above described switches are best suited for packet or circuit switching applications. When a session between an NIU and a decoder/destination is terminated, a new connection can be established by the NIU adjusting the variable optical delay to a new slot position. During the session, bits belonging to the same packet or conversation are positioned in the same time slot.

It should be understood that the foregoing description is only illustrative of the invention. Various alternatives and modifications can be devised skilled in the art without departing from the invention. Accordingly the present invention is intended to embrace all such alternatives, modifications, and variances which fall within the scope of the appended claims.

We claim:

1. An optical message distribution system for routing messages from a plurality of remote sources to a plurality of remote destinations, each message including a destination address portion and a data portion, said distribution system including a plurality of network interface units, each said network interface unit comprising:
   means for receiving a message from a remote message source and segregating the destination address portion of the message from the data portion;
   decoding means for transforming said destination address portion into a time delay indication;
   optical clock pulse generating means for generating optical clock pulses, a time between succeeding optical clock pulses termed a frame;
   variable optical delay means responsive to said time delay indication, for delaying at least an initial clock pulse within a frame by the amount of said time delay indication;
   means for modulating optical clock pulses in accordance with said data portion, and appending said modulated optical clock pulses to said frame that includes said initial delayed optical clock pulse, each said modulated optical clock pulse being delayed by the same amount in a frame as said delayed initial optical clock pulse; and
   optical sum means for combining said optical pulses from each network interface unit and transmitting said pulses to said remote destinations.

2. The optical message distribution system as recited in claim 1, wherein said decoding means comprises table means for converting a decoded address from a remote message source into said time delay indication.

3. The optical message distribution system as recited in claim 2 wherein said means for modulating said optical clock pulses comprises an optical modulator and a delay circuit, said delay circuit receiving said data portion and applying it to said modulator after a preset delay which is at least equal to a time duration of a said frame.

* * * * *